(12) United States Patent  
Chen (10) Patent No.: US 8,494,360 B2  
(45) Date of Patent: Jul. 23, 2013

(54) IN-SERVICE OPTICAL NETWORK TESTING

(75) Inventor: David Zhi Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 918 days.

(21) Appl. No.: 12/429,632

(22) Filed: Apr. 24, 2009

(65) Prior Publication Data

US 2010/0272431 A1 Oct. 28, 2010

(51) Int. Cl.
*H04B 10/08* (2006.01)

(52) U.S. Cl.
USPC ............... 398/16; 398/29; 398/147; 398/148; 398/81; 398/162; 398/152; 398/31; 398/33; 356/73.1; 356/491; 356/364; 385/11; 385/24; 385/27

(58) Field of Classification Search
USPC ................ 398/16, 29, 31, 81, 147, 159, 162, 398/25, 26, 27, 28, 30, 33, 38, 148, 158, 398/183, 192, 152, 65, 195; 356/73.1, 491, 356/364, 365, 477; 385/11, 15, 24, 27, 122
See application file for complete search history.

(56) References Cited

U.S. PATENT DOCUMENTS

| | | | |
|---|---|---|---|
| 2005/0078964 A1* | 4/2005 | Takahara et al. | 398/147 |
| 2005/0147415 A1* | 7/2005 | Fee et al. | 398/159 |
| 2008/0085125 A1* | 4/2008 | Frankel | 398/159 |
| 2009/0196602 A1* | 8/2009 | Saunders et al. | 398/26 |
| 2009/0297140 A1* | 12/2009 | Heismann et al. | 398/16 |
| 2010/0239245 A1* | 9/2010 | Yao | 398/27 |

* cited by examiner

*Primary Examiner* — Hanh Phan (57) ABSTRACT

A system may include a first measurement device configured to be coupled to a first node in an optical path being measured. The first measurement device may be configured to generate a signal at an initiating device; identify an unused channel in an optical path, wherein the optical path includes at least two spans; and transmit the signal on the unused channel. A second test device may be configured to be coupled to a last node in the optical path being measured. The second measurement device may be configured to: receive the signal at a destination device; compensate the signal for chromatic dispersion (CD) and/or polarization mode dispersion (PMD) effects; and determine CD and/or PMD measurements associated with the optical path being measured based on the compensation.

16 Claims, 8 Drawing Sheets

IN-SERVICE OPTICAL NETWORK TESTING

BACKGROUND INFORMATION

Routing video, data and voice traffic at high bit rates via Ultra Long Haul (ULH) or Metro optical networks is substantially increasing in the modern communications systems. Accordingly, proper testing of such optical networks is performed to ensure network performance, quality of services, and reliability. However, the fiber optic cables that carry optical signals within the optical networks may often contain asymmetries introduced during manufacture or installation or resulting from environment conditions. These asymmetries result in the optical properties of the fiber not being the same in all directions. These differences may render the fiber birefringent along the fiber cables, where the material displays two different indices of refraction. This fiber birefringence causes polarization mode dispersion (PMD), which may impair the transmission of telecommunication signals over the optical fibers. Also, due to the physical path in the optical network, different types of fibers are installed along a ULH link. This may also complicate the PMD as well as chromatic dispersion evaluations.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to testing and compensating for polarization mode dispersion (PMD) and residual chromatic dispersion (RCD) effects corresponding to an entire optical path that potentially spans multiple network devices. "RCD" refers to CD effects present on a multi-span link after initial CD compensation has already been performed on each span in the link. The optical path may pass through a number of amplifiers (e.g., Raman amplifiers (discrete and distributed), erbium doped fiber amplifiers (EDFAs), hybrid amplifiers (e.g., hybrid EDFA/Raman amplifiers)), and a number of nodes, such as nodes that include optical add-drop multiplexers, demultiplexers, etc.

In one exemplary implementation, a source signal may be injected into a selected channel in the optical path. The source signal may be transmitted at selected bit rates corresponding to potentially provided data rates along the selected channel. As the test signal passes through a number of amplifiers and filters, PMD and RCD effects may modify the test signal. A receiving test device may receive the variable bit-rate signal, may compensate for PMD and RCD effects, and compensate for these affects. The receiving device may further report the results of the PMD and RCD determinations to the initiating test device or other devices. In an exemplary implementation, the portion of the test signal that passed through all the nodes may be used to determine and potentially compensate for the overall, end-to-end PMD and/or RCD characteristics of the optical path. Although the following description refers primarily to compensating and measuring PMD and RCD effects, other network effects may be similarly handled, such as non-residual CD effects, etc.

Figure 1:
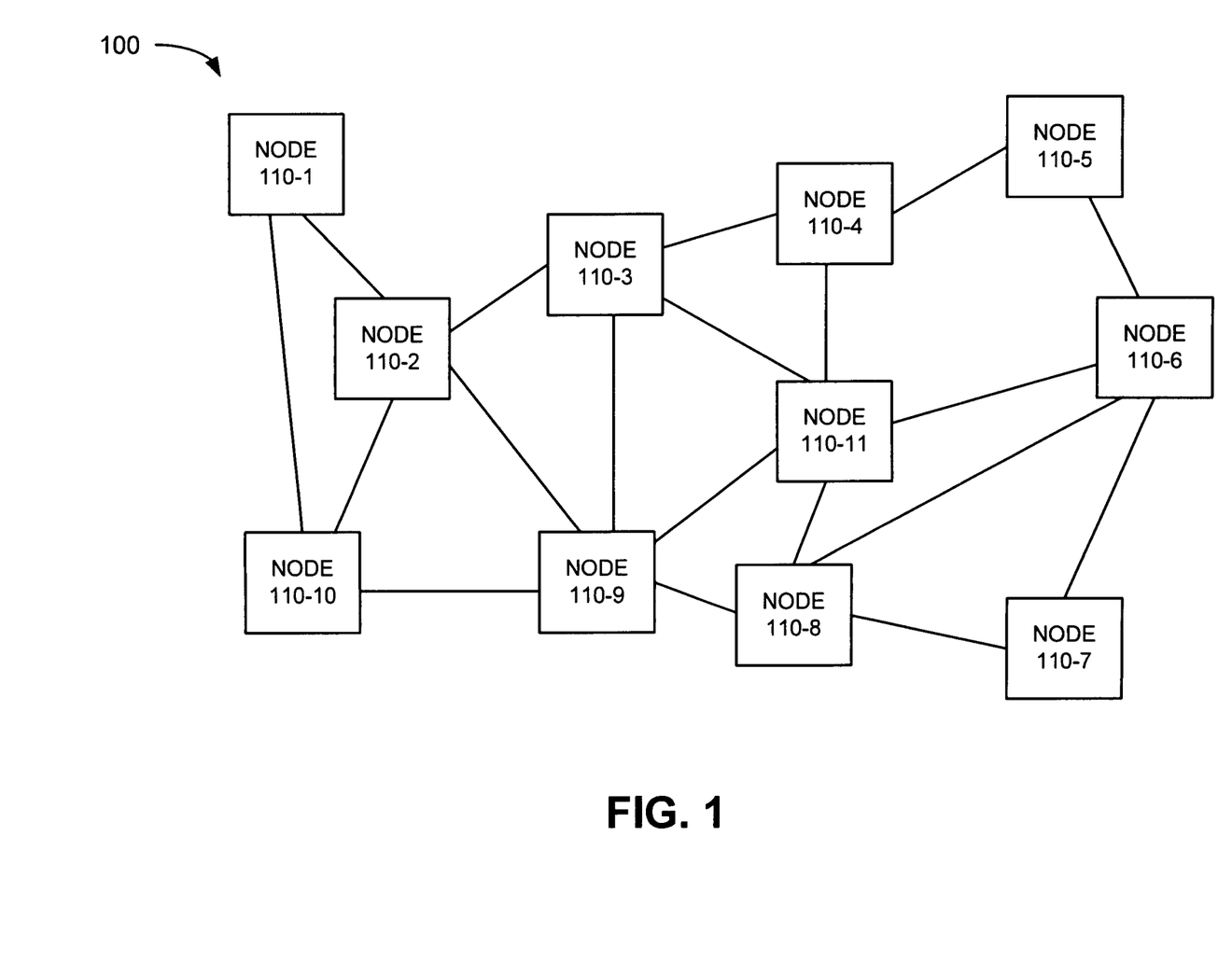
FIG. 1 illustrates an exemplary network in which systems and methods described herein may be implemented.

FIG. 1 is a block diagram of an exemplary network 100 in which systems and methods described herein may be implemented. Network 100 may represent a mesh network that include a number of nodes 110-1 through 110-11, referred to collectively as nodes 110 and individually as node 110 or node 110-N (where N represents any value). In mesh network 100, each line connecting one of nodes 110 to another of nodes 110 may represent one or more optical fibers interconnecting the nodes 110. Each optical fiber may also include a large number of individual channels upon which data may be transmitted. For example, data in network 100 may be transmitted using wavelength division multiplexing (WDM), in which multiple optical carrier signals are transmitted on a single optical fiber by using different wavelengths of laser light or electromagnetic radiation to carry different channels. In some implementations, data in network 100 may be transmitted using dense wavelength division multiplexing (DWDM). DWDM uses the C band (i.e., frequencies between 1530 and 1565 nanometers (nm)) and/or L band (i.e., wavelengths between 1565 and 1625 nm). The term "light" as used herein should be construed to include any type of electromagnetic radiation.

Figure 8:
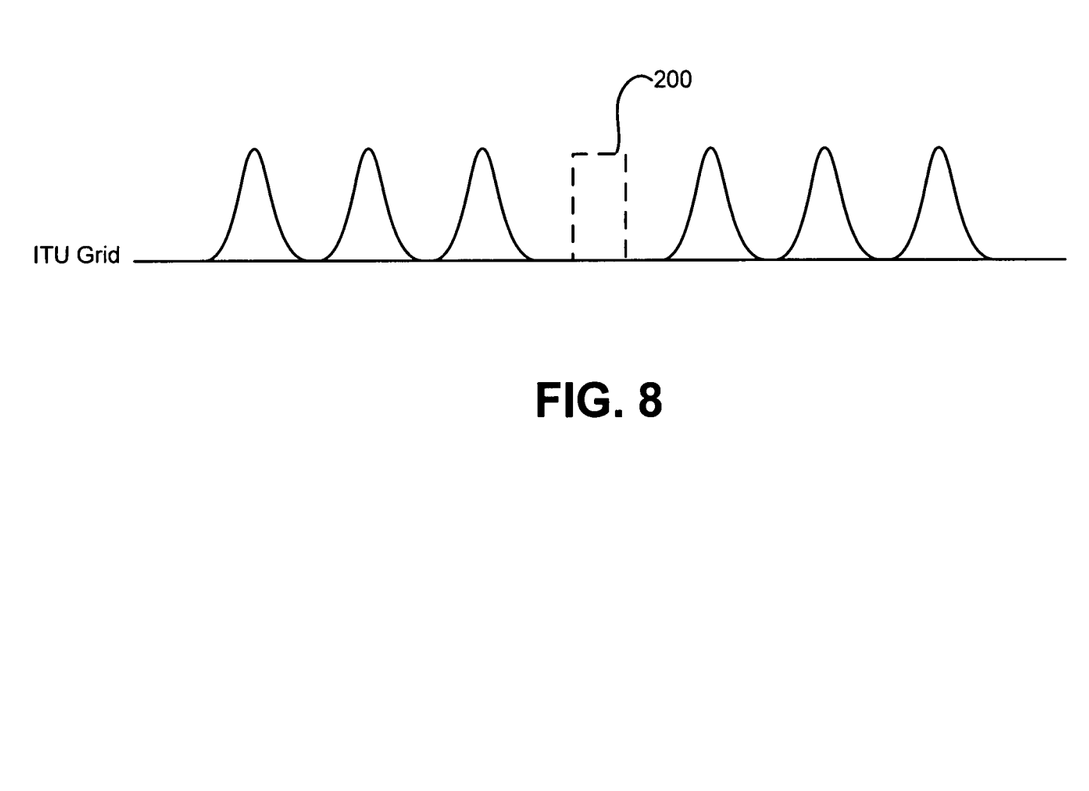
FIG. 8 is a graphical depiction of an available channel among a number of dense wavelength division multiplexing channels.

In an exemplary implementation, each node 110 may represent an optical add-drop multiplexer (OADM), such as a reconfigurable optical add-drop multiplexer (ROADM) that can switch traffic on the optical domain, without the need to convert the optical signals from/to electrical signals. For example, each node 110, also referred to herein as ROADM 110, may include a ROADM that can remotely switch traffic that was transmitted using WDM or DWDM at the wavelength layer. Each ROADM may include one or more tunable filters that receive a stream of optical signals having different wavelengths that can direct a selected channel (e.g., a particular wavelength in the range of the optical system being implemented (e.g., C-band or L-band)). By using a ROADM, individual or multiple optical channels having different wavelengths may be added and/or dropped from a transport optical fiber without requiring node 110 to convert the optical signals on the WDM channels to non-optical (i.e., electrical) signals and then back to optical signals. For example, FIG. 8 is a graphical depiction of an available channel 200 among a number of DWDM channels.

As described above, network 100 may include a number of optical amplifiers (not shown) configured to amplify or boost optical signals at points within network 100. Optical amplifiers may include Raman, DFA, EDFA, or hybrid amplifiers.

Figure 2:
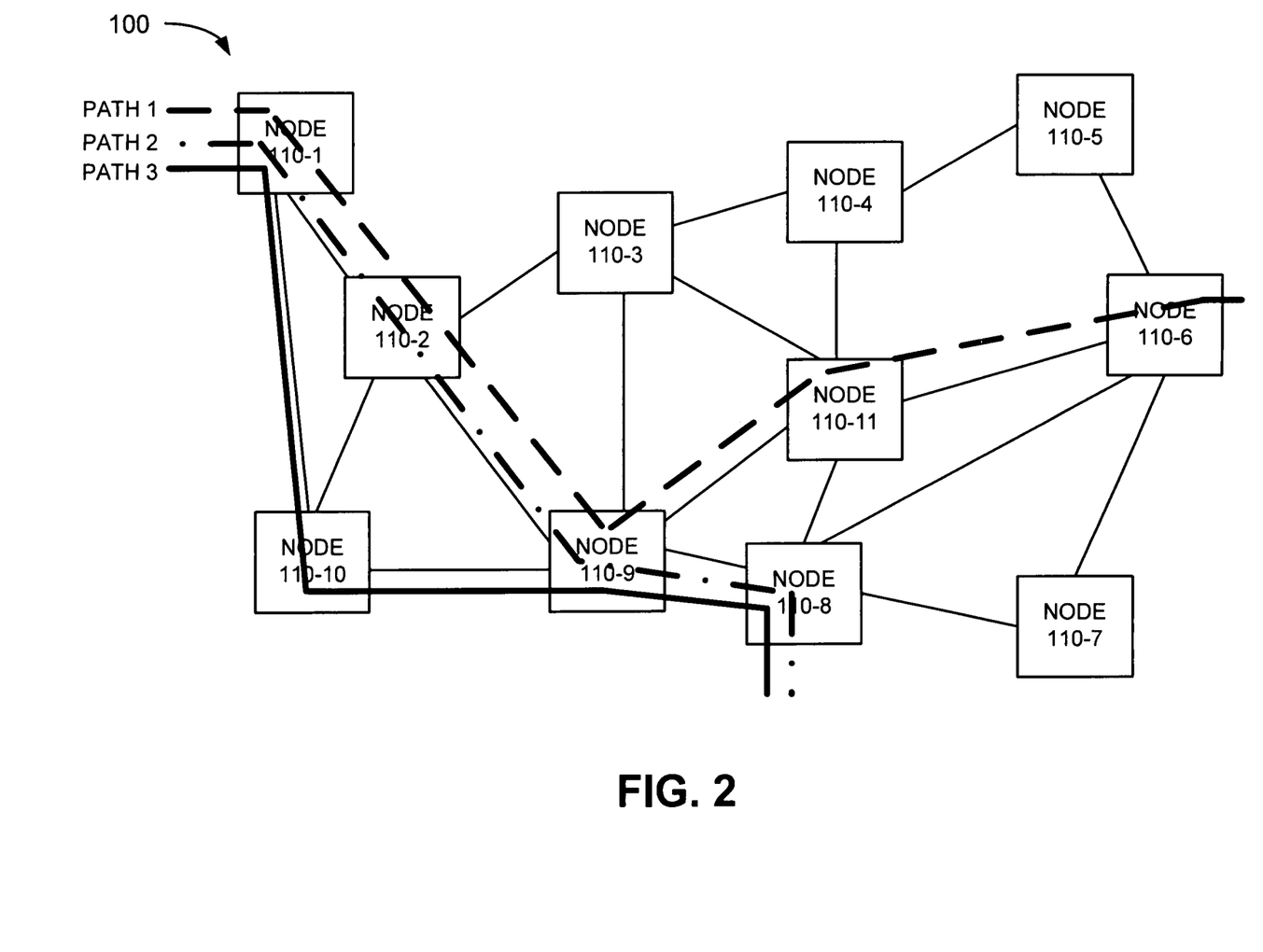
FIG. 2 illustrates exemplary paths in the network of FIG. 1.

As illustrated in FIG. 1, each node 110 in network 100 may be connected to several other nodes 110 to form a mesh network that allows traffic from a source to a destination to be routed in several different ways. For example, FIG. 2 illustrates exemplary paths through network 100. Referring to FIG. 2, traffic may be transmitted from node 110-1 to node 110-8 via path 2 (shown by the dotted and dashed line), which includes nodes 110-1, 110-2, 110-9 and 110-8. Alternatively, traffic may be transmitted from node 110-1 to node 110-8 via path 3 (shown by the heavy solid line), which includes nodes 110-1, 110-10, 110-9 and 110-8. Network 100 may route data from node 110-1 to node 110-8 using either of paths 2 or 3. Similarly, network 100 may include multiple paths connecting other ones of nodes 110 and may use a particular path based on network conditions. For example, data may be transmitted from node 110-1 to node 110-6 via path 1 (shown with the dashed line). Having multiple paths interconnecting nodes 110 allows traffic to be routed on network 100 to avoid, for example, congested portions of network 100 and/or failed portions of network 100.

The exemplary network configuration illustrated in FIG. 1 and exemplary paths illustrated in FIG. 2 are provided for simplicity. A typical network 100 may include more or fewer nodes 110 than illustrated in FIG. 1, more paths than illustrated in FIG. 2, or a different configuration of nodes and paths than illustrated. Network 100 may also include additional elements, such as amplifiers, switches, gateways, routers, monitoring systems, etc., that aid in routing traffic toward its intended destination.

As described above, each of nodes 110 may represent a ROADM used to switch signals at the wavelength layer. That is, each ROADM 110 may include a multiplexing device that allows the ROADM to add one or more channels on a fiber, as well as a demultiplexing device that allows the ROADM to drop one or more channels on a fiber. Each ROADM 110 may also include one or more tunable filters that has its own band-pass characteristic. For example, filters located in ROADMs 110 may be individually tuned based on, for example, temperature conditions, and each filter could be offset by a different amount. For example, a filter at a first ROADM 110 in a path (e.g., ROADM 110-1) may be offset to the left of the center frequency by 1-2 gigahertz (GHz), while a filter at another ROADM 110 in the path (e.g., ROADM 110-10) may be offset to the right by 1-2 GHz. In additional, ROADMs 110 may include amplifier and/or splitting components that may introduce polarization dependent gain (PDG) or polarization dependent loss (PDL) into the optical signal.

Materials, devices, and various environmental factors, such as temperature, fiber movement, and mechanical stress on the fibers may affect transmission of an optical signal through network 100. For example, a quality of a link of optical fiber (e.g., a link of fiber between nodes 110-1 and 110-2 in path 2) may affect a given path's ability to support transmission of signals without unacceptable error rates. For example, optical fibers that carry optical signals may contain asymmetries. These asymmetries result in the optical properties of the fiber not being the same in all directions, resulting in birefringence. Birefringence refers to changes in refractive index within a fiber that cause varying transmission speeds of the two orthogonal polarization modes that together make up the optical signal.

This fiber birefringence may cause PMD, which may impair the transmission of signals over telecommunication optical fiber at line rates of 10 gigabits per second (Gbps) or above over long distances e.g., ultra long haul (ULH) spans. Similar to PMD, fiber and related device characteristics and environmental factors may also cause chromatic dispersion (CD) of a light signal as it travels through a fiber. CD refers to a broadening of an input signal. The broadening of the signal may cause the signal to diverge or disperse and bleed into neighboring wavelength channels. In addition to birefringence inducing PMD, optical amplifiers, splitters, and/or other devices may introduce PDG or PDL characteristics into a network path, each of which may impact a signal to noise ratio (SNR) associated with the path.

In traditional, point-to-point optical fiber networks, measurement and compensation of PMD and CD typically occurred upon deployment of the dedicated network. However, with the advent of optical mesh networks, a single path through a network may change in a dynamic manner with the addition/removal of nodes, optical amplifiers, etc. Accordingly, testing of an optical mesh network for each possible path through the network may be unworkable, if not impossible, at the time of network creation. Conventional testing in such circumstances would typically involve taking all network devices (e.g., ROADMs) in a path out of service and testing each link in the path for PMD and RCD across a range of wavelengths. Such testing environments do not allow for in-service testing of any portion of the optical network.

Figure 3:
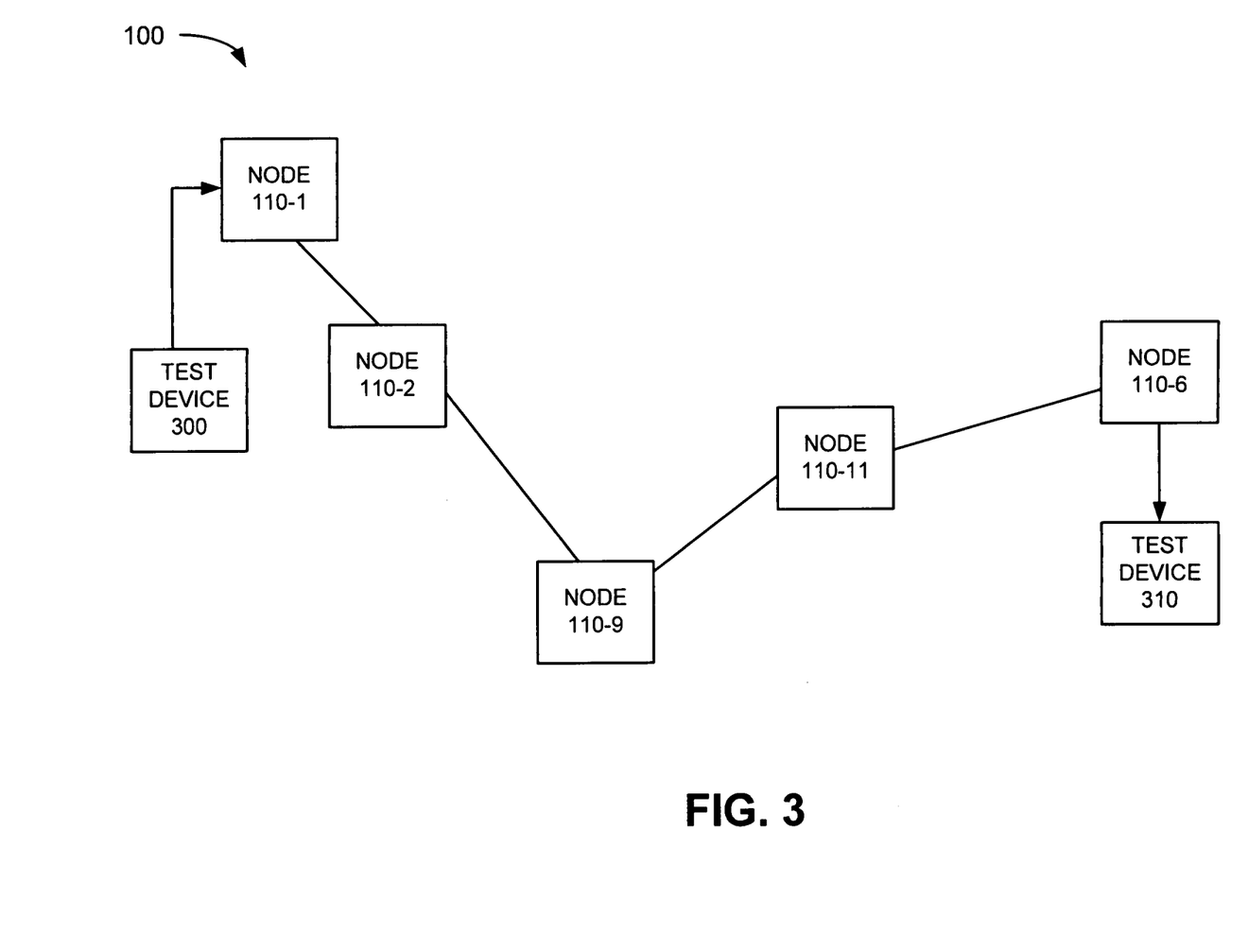
FIG. 3 illustrates an exemplary test scenario to test one of the paths of FIG. 2.

In accordance with an exemplary implementation, test devices for in-service testing may be configured to provide testing for an optical path in network 100 without taking any of nodes 110 out of service. For example, FIG. 3 illustrates an exemplary scenario in network 100 in which a transmitter test device 300 and a receiver test device 310 may be used to test an optical path, such as path 1 illustrated in FIG. 2. Referring to FIG. 3, test device 300 may represent a transmitter device used to generate and transmit a test signal on a selected channel at node 110-1 (e.g., a channel not currently being used for normal traffic). The test signal may be provided to node 110-1 and transmitted from node 110-1 to node 110-6 via nodes 110-2, 110-9 and 110-11. At the end of the path, test device 310 may represent a receiver device used to receive optical data, analyze the spectral content and determine the overall PMD and/or CD characteristics of the optical path, as described in more detail below.

Figure 4:
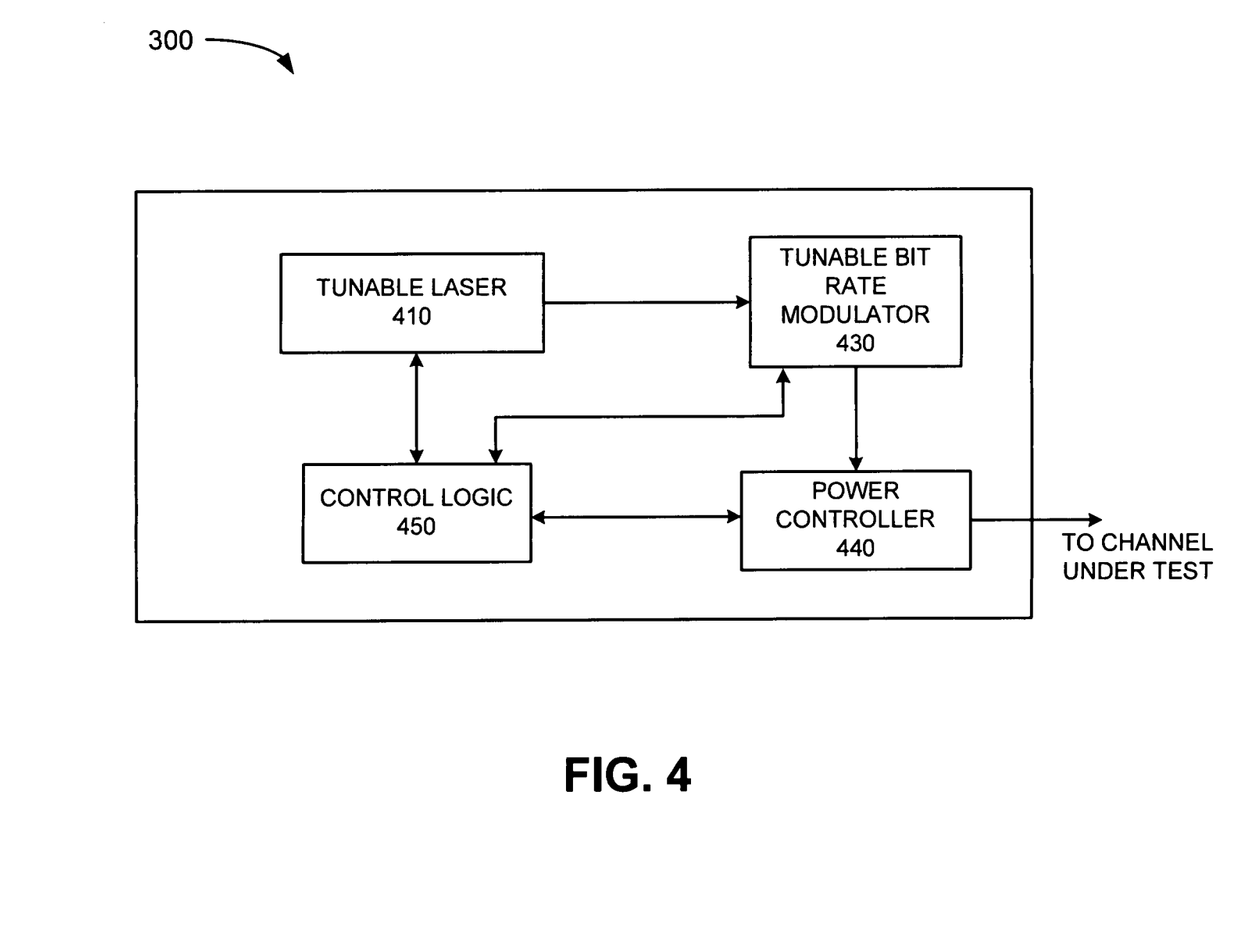
FIG. 4 is a block diagram illustrating exemplary configurations of the transmitter test device of FIG. 3.

FIG. 4 illustrates an exemplary configuration of a test device 300 that may be coupled to any node 110 of network 100 for testing an optical path in network 100. Referring to FIG. 4, test device 300 may include tunable laser 410, tunable bit-rate modulator 430, power controller 440, and control logic 450. The configuration illustrated in FIG. 4 is provided for simplicity. In other implementations, more, fewer, or different arrangement of components may be included in test device 300. For example, one or more display devices or user interfaces may be included in test device 300 to allow a network engineer (or other party) to initiate a test on an optical path. In addition, one or more power supplies, or other components may be included in test device 300 to facilitate testing.

Tunable laser 410 may include an erbium doped fiber light source (i.e., laser) that emits a broadband spectrum in the C-band (i.e., wavelengths between 1530 and 1565 nanometers) and/or L band (i.e., wavelengths between 1565 and 1625 nanometers). Tunable laser 410 may also provide an optical signal adequate for high data rate testing, such as 100 Gbps or more.

Tunable laser 410 may be configurable to output light at a particular selected channel wavelength. For example, in an exemplary implementation, tunable laser 410 may support 50 GHz and 100 GHz channel spacing. The tuning range of tunable laser 410 may cover C-band and L-band wavelengths. In addition, the tuning accuracy of tunable laser 410 may be based on the 50 GHz international telecommunications unit (ITU) grid. The values of tunable laser 410 listed above are exemplary only and tunable laser 410 may have other parameters based on the particular circumstances and/or optical path being tested.

In operation, tunable laser 410 may receive a user selection of an available (e.g., unused) channel at initial node 110-1 and may tune light from tunable laser 410 to use that channel. For example, control logic 450 may be configured to receive a test/measurement request from a network administrator and identify an available channel for transmitting a signal. Control logic 450 may initiate tuning of tunable laser 410 and output of a test signal from tunable laser 410.

Tunable bit-rate modulator 430 may include a modulator used to modulate the bit rate of the test signal generated by tunable laser 410 throughout a range of desired bit rates. In an exemplary implementation, tunable bit-rate modulator 430 may modulate the test signal from signal source 410 in a sinusoidal pattern at bit rates ranging from approximately 2.5 Gbps to approximate 40 Gbps). In this manner, testing of a path may include scanning across a range of available bit rates. Other bit rates may be used by tunable bit-rate modulator 430 up to and including 100 Gbps bit rates. It should be noted that wavelength scanning techniques are not used, to avoid undesirable interactions with live channels.

Power controller 440 may include logic to enable the test signal to include a launch power substantially equivalent to DWDM individual channel power in network 100, such that testing results for the test signal may be correlated to results for actual network traffic. In addition, injected signals having significantly more or less power than typical network traffic may undesirably affect traffic on neighboring traffic through ROADMs 110. Depending on the particular ROADMs 110 and number of ROADMs that are part of the optical path being tested, different launch powers may be needed to transmit an optical test signal. In an exemplary implementation, power controller 440 may provide signal power ranging from approximately ±3-4 dBm. In one implementation, a network engineer or technician may interact with a user interface/input device included on test device 300 (not shown in FIG. 4) to input the type of ROADMs 110 in the optical path being tested, and test device 300 will automatically provide the proper power level for signal source 410. In addition, power controller 440 or signal source 410 may ensure that the power of the test signal is maintained at a constant average power level to match with the rest of the DWDM signal power. This may help avoid or minimize automatic gain flattening adjustment that may be performed by various circuits included in ROADMs 110 or elsewhere along the optical path.

In one exemplary implementation, power controller 440 may include an optical boost amplifier (OBA) configured to increase the gain of an optical signal without optical-electric-optical conversion. Power controller 440 may also include an optical attenuator configured to provide dynamic channel equalization by enabling active attenuation or regulation of optical output power.

In other implementations, power controller 440 may not be needed. That is, tunable laser 410 may be configured to provide adequate signal power (and having a constant average power level) regardless of the optical path being tested.

Control logic 450 may include logic to interact with tunable laser 410, tunable bit rate modulator 430, and power controller 440, and to receive identified PMD and RCD values, e.g., from receiving test device 310. For example, control logic 450 may include interface logic for executing a test. Control logic 450 may identify paths/channels that are available for testing (e.g., dark channels) and may provide a listing of available paths/channels to a network administration, e.g, via a display device, or remotely via network communication logic.

Control logic 450 may be configured to receive a user selection of a particular path/channel and may tune the output of laser 410 to output a test signal onto the selected path/channel. Control logic 450 may be further configured to control bit rate modulation by bit rate modulator 430 in compliance with testing parameters. Control logic 450 may be further configured to interact with power controller 440 for controlling power adjustments made to the output test signal.

In addition to executing test initiation, control logic 450 may include an out-of-band communication interface (e.g., an Ethernet interface) for receiving test results information from the receiving test device. In this manner, test device 300 may be notified of the results of a test initiated at test device 300, for display or output to an initiating user.

As described above, the configuration in FIG. 4 is exemplary only. For example, in other implementations, test device 300 illustrated in FIG. 4 may be configured differently. The exemplary configuration for test device 300 illustrated in FIG. 4 is provided for simplicity. It should be understood that test device 300 may include more or fewer components than illustrated in FIG. 4. For example, in some exemplary implementations, test device 300 may include one or more communication interfaces for receiving information from a remote device (e.g., receiving test device 310) and/or providing information to a remote device associated with controlling an optical path test. This may allow all or a portion of an optical path test to be initiated, controlled and/or analyzed remotely with respect to ROADMs 110 in network 100.

Figure 5:
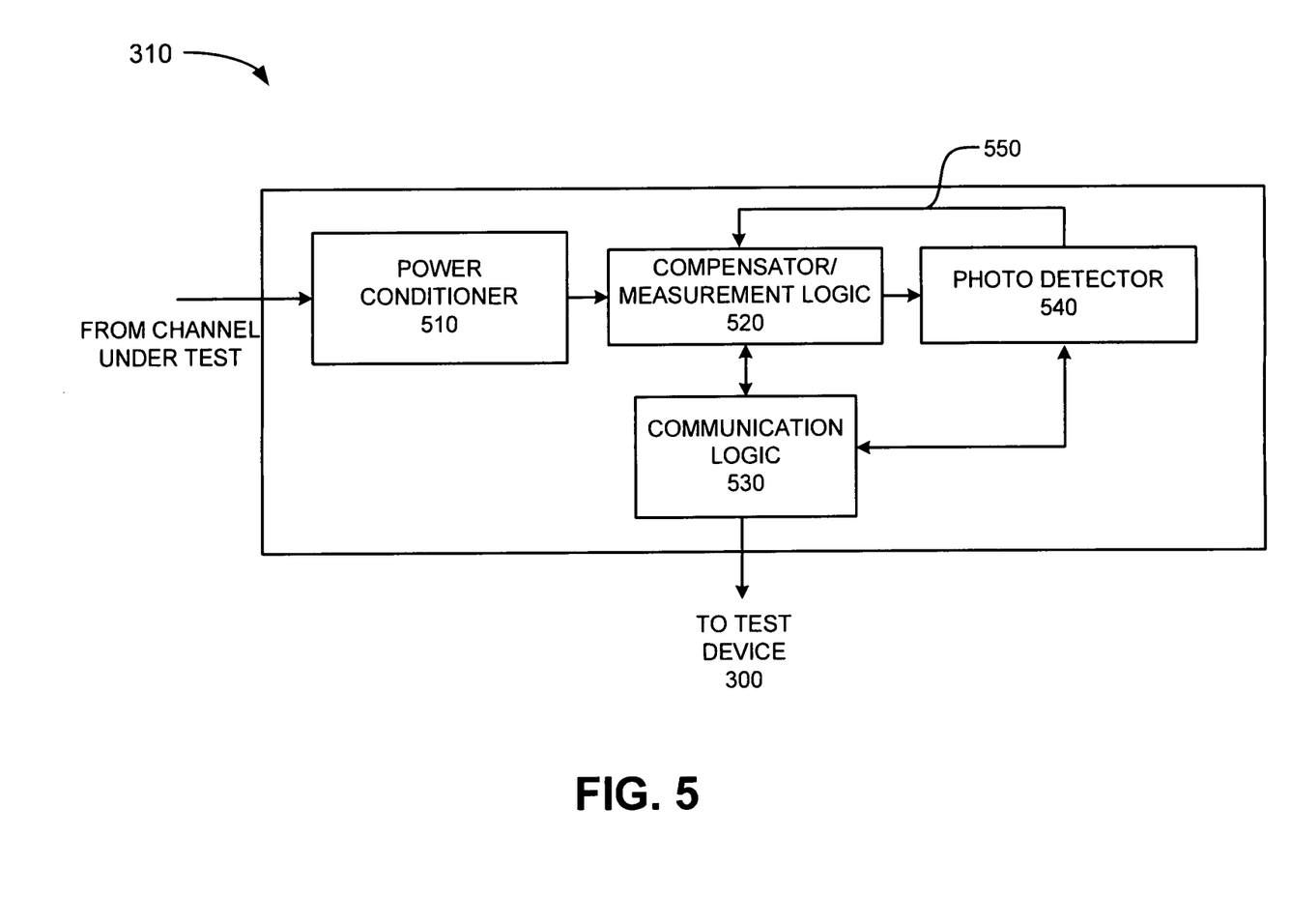
FIG. 5 is a block diagram illustrating an exemplary configuration of the receiver test device of FIG. 3.

Test device 300, as described above, may provide a test signal within a selected channel on one of ROADMs 110. Receiver test device 310 may receive the test signal for the channel under test from ROADM 110-6 and may analyze the portion of network 100 illustrated in FIG. 3, as described in more detail below. FIG. 5 is an exemplary functional block diagram of components implemented in the receiver test device 310. Referring to FIG. 5, receiver test device 310 may include power conditioning logic 510, compensator/measurement logic 520, communication logic 530, and photo detector 540. The configuration illustrated in FIG. 5 is provided for simplicity. In other implementations, more or fewer or a different configuration of components may be included in test device 310. For example, one or more display devices or user interfaces may be included in test device 300 to allow a network engineer (or other party) to view results of a test on the optical path. In addition, one or more power supplies, or other components may be included in test device 310 to facilitate testing and analyzing test data.

Power conditioning logic 510 may include logic configured to receive the test optical signal (e.g., from ROADM 110-6) and enhance the power of the received optical signal to a suitable level. For example, power conditioning logic 510 may include a semiconductor optical amplifier (SOA) or doped fiber amplifier configured to recover a signal from an input signal having weak power (semiconductor optical amplifier).

Compensator/measurement logic 520 may include logic to receive the output of power conditioning logic 510 and analyze the output to compensate for effects of PMD or RCD. In compensating for such effects, compensator/measurement logic 520 may identify PMD and RCD values associated with the test signal at various bit rates. Compensator/measurement logic 520 may be configured to receive a feedback signal 550 from photo detector 540. Feedback signal 550 may include information relating to the quality of the optical signal received at photo detector 540. The quality information may be used by compensator/measurement logic 520 to enable further optimization of the output signal and, accordingly, identification of accurate PMD and RCD measurements. In some implementations, feedback signal 550 may include a bit error rate (BER) signal or an optical signal to noise (OSR) ratio signal.

Communication logic 530 may include logic to display (e.g., on a display) and/or forward the identified PMD and RCD values, e.g., to other ROADMs 110 or other devices in network 100, or to a control element (not shown) that may maintain a record of PMD and CD values for various channels and paths through network 100. For example, when it is determined that a particular channel in a path through network 100 is not currently used (e.g., is "dark"), test devices 300 and 310 may be configured to, through compensation, identify PMD and RCD values corresponding to the path. Receiving test device 310 may then be configured, via communication logic 530, to forward the results of the test to, for example, transmitting test device 300. Communication logic 530 may also be configured to output test results on a display or other output device, or to a network administration remote from both test device 300 and test device 310. In other implementations a device (not shown) remote from test devices 300 and 310 may be configured to initiate the test of the dark path through network 100.

Photo detector 540 may include any photo detector or other device/circuitry that converts received light into electrical signals. For example, photo detector 540 may receive the output of compensator/measurement logic 520 and convert the optical output into electrical signals. A quality determination may be made in relation to the received test signal and an indication of the quality may be returned to compensator/measurement logic 520 via feedback signal 550. As described above, the quality determination may include a BER determination or an optical SNR determination. Responsive to the receive quality signal, compensator/measurement logic 520 may recursively optimize the test signal and the corresponding PMD and RCD measurements. In one implementation, testing is complete upon convergence of the signal quality to an optimized value. For example, if further compensation of the test signal results in a signal having reduced quality, the prior values of the test signal may be considered to be optimized.

Figure 6:
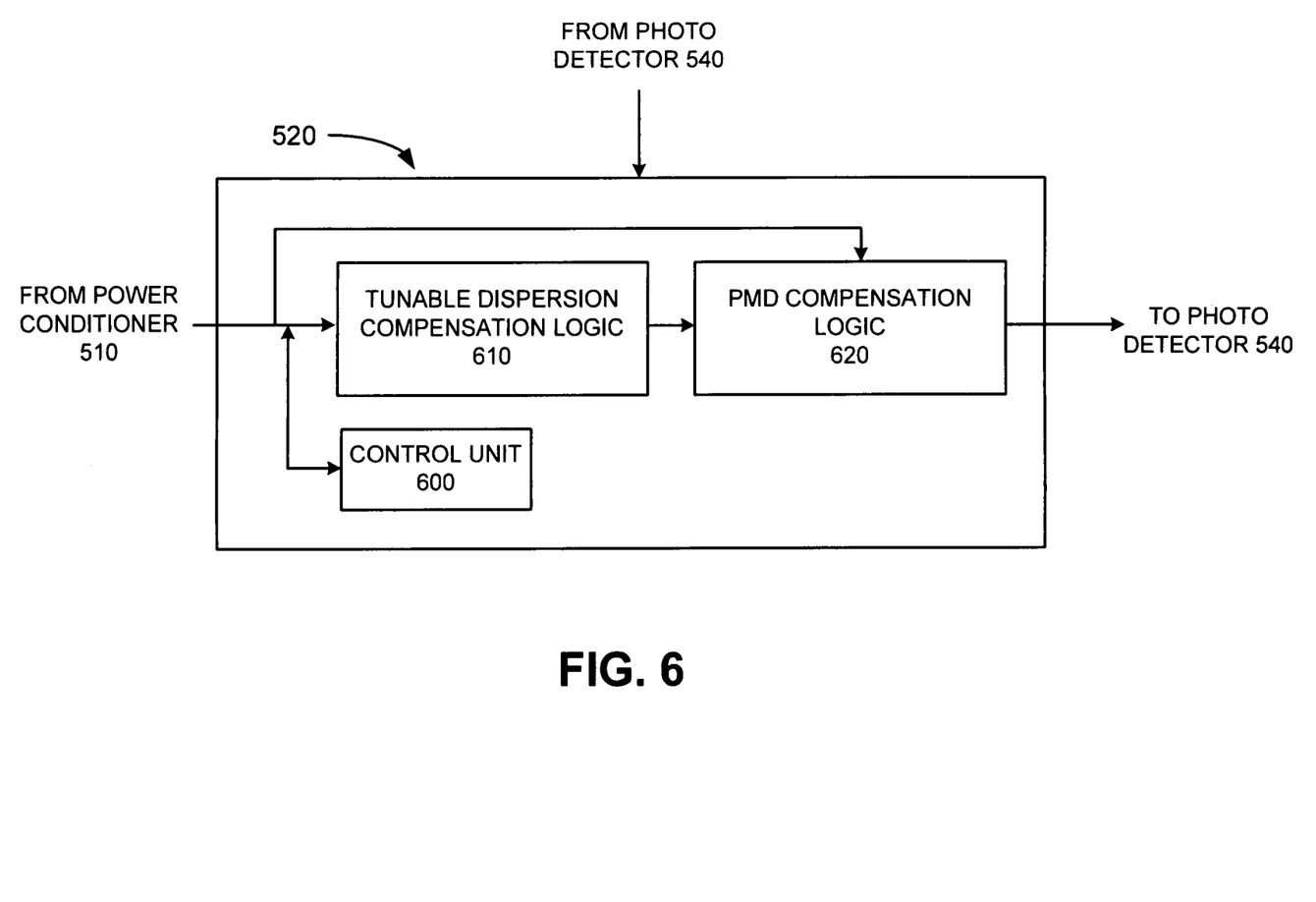
FIG. 6 is a block diagram illustrating an exemplary configuration of the compensation/measurement logic of FIG. 5.

FIG. 6 is a block diagram illustration one implementation of compensator/measurement logic 520 of FIG. 5. As shown in FIG. 6, in one exemplary implementation, compensator/measurement logic 520 may include control unit 600, tunable dispersion compensation logic 610, and PMD compensation logic 620. Control unit 600 may be configured to receive the test signal from power conditioning logic 510. Control unit 600 may determine whether RCD is present in the test signal and needs to be compensated for. If control unit 600 determines that RCD is present, the test signal may be routed to tunable dispersion compensation logic 610. Otherwise, the test signal may bypass tunable dispersion compensation logic 610 and proceed directly to PMD compensation logic 620.

Tunable dispersion compensation logic 610 may include logic to receive the test signal (at various bit rates) from power conditioning logic 510 and compensate for RCD effects in the received test signal. As described briefly above, RCD refers to a spreading of an optical signal that typically occurs in metro and ultra long haul optical spans. CD compensators (not shown) may be placed at various points (e.g., every 80 or 90 kilometers) in network 100 to reduce the effects of RCD, however, residual CD effects typically remain.

According to one implementation, tunable dispersion compensation logic 610 may be configured to further identify and reduce the effects of the residual CD on the test signal, thereby increasing the accuracy with which PMD compensation logic 620 may subsequently compensate for the effects of PMD on the test signal. For example, for a test signal at a given bit rate (e.g., 10 Gbps), tunable dispersion compensation logic 610 may identify and compensate for residual CD effects present in the test signal. Similar compensation may occur for each bit rate being tested (e.g., 10 Gbps, 40 Gbps, 100 Gbps, etc.).

PMD compensation logic 620 may include logic to receive an output of tunable dispersion compensation logic 610 (or power conditioning logic 510 when bypassing tunable dispersion compensation logic 610). PMD compensation logic 620 may compensate for PMD effects included in the received optical signal. By compensating for PMD effects, PMD compensation logic 620 may identify a value corresponding to the PMD effects associated with the path/channel under test for each bit rate being tested.

PMD may be measured in any suitable manner. Examples of compensation/measurement techniques include, but are not limited to, interferometric methods (e.g., an auto-correlation interferometric method), the Jones Matrix Eigenanalysis (JME) method, etc. Execution of each compensation method may result in a PMD measurement representing the delay between the two polarization orientations normalized over the length of the path. In some implementations, the PMD compensation includes all orders of PMD (first, second, and all high orders of PMD). The units of linear differential group delay (DGD) PMD are picoseconds (ps of delay) and the second order PMD is $ps^2$ (picoseconds squared).

In one exemplary implementation, PMD compensation logic 620 may include logic for separating the horizontal and vertical signals from the received test signal. PMD compensation logic 620 may then compare the orthogonal signals (i.e., the horizontal and vertical components or two physical degenerate states) to each other and shift them to put them closer together, using, e.g., multiple optical wave plates. The amount of shift required to optimize the output signal accurately identifies an amount of PMD that was compensated for.

Although not explicitly referenced above in relation to FIGS. 1-3, in some implementations consistent with embodiments described herein, network 100 may include one or more optical switches configured to switch traffic entirely within the optical domain. For example, an optical switch may be configured to switch traffic from a first channel (e.g., wavelength) to a second channel for a portion of a path in a ULH network. In such implementations, the optical switch may be remotely configured or controlled to switch optical traffic between different channels depending on availability. By using optical switches, multiple channels may be used to form a path through an optical mesh network (e.g., network 100).

In order to accurately identify and compensate for PMD effects in such a switched network, testing devices may be employed adjacent to each switch. For example, assume that an optical switch has changed a channel of traffic adjacent to node 110-9 in path 1 of FIGS. 2 and 3. In such an implementation, a receiver test device 310 may be used on the upstream side of the optical switch to identify PMD and residual CD effects on a first portion of path 1 upstream of the optical switch. A transmitter test device 300 may be used on the downstream side of the optical switch to initiate testing of a second portion of path 1 downstream of the optical switch.

In one exemplary implementation, various ROADMs 110 within network may include integrated testing equipment (e.g., test devices 300 and 310). ROADMs 110 may be remotely configurable across network 100 to both notify other ROADMs 110 of used and unused channels as well as to responding to test requests. In this manner, testing may be performed when network channels/paths are unused, to provide an identification of the capabilities of the particular channel/path. Testing may be performed at any suitable interval, such as daily, weekly, etc.

In another exemplary implementation, testing may only be performed at edge nodes in network 100. This may allow for the measurement of the PMD effects affecting the entire path and may reduce the testing and reporting requirements of the testing system.

Figure 7:
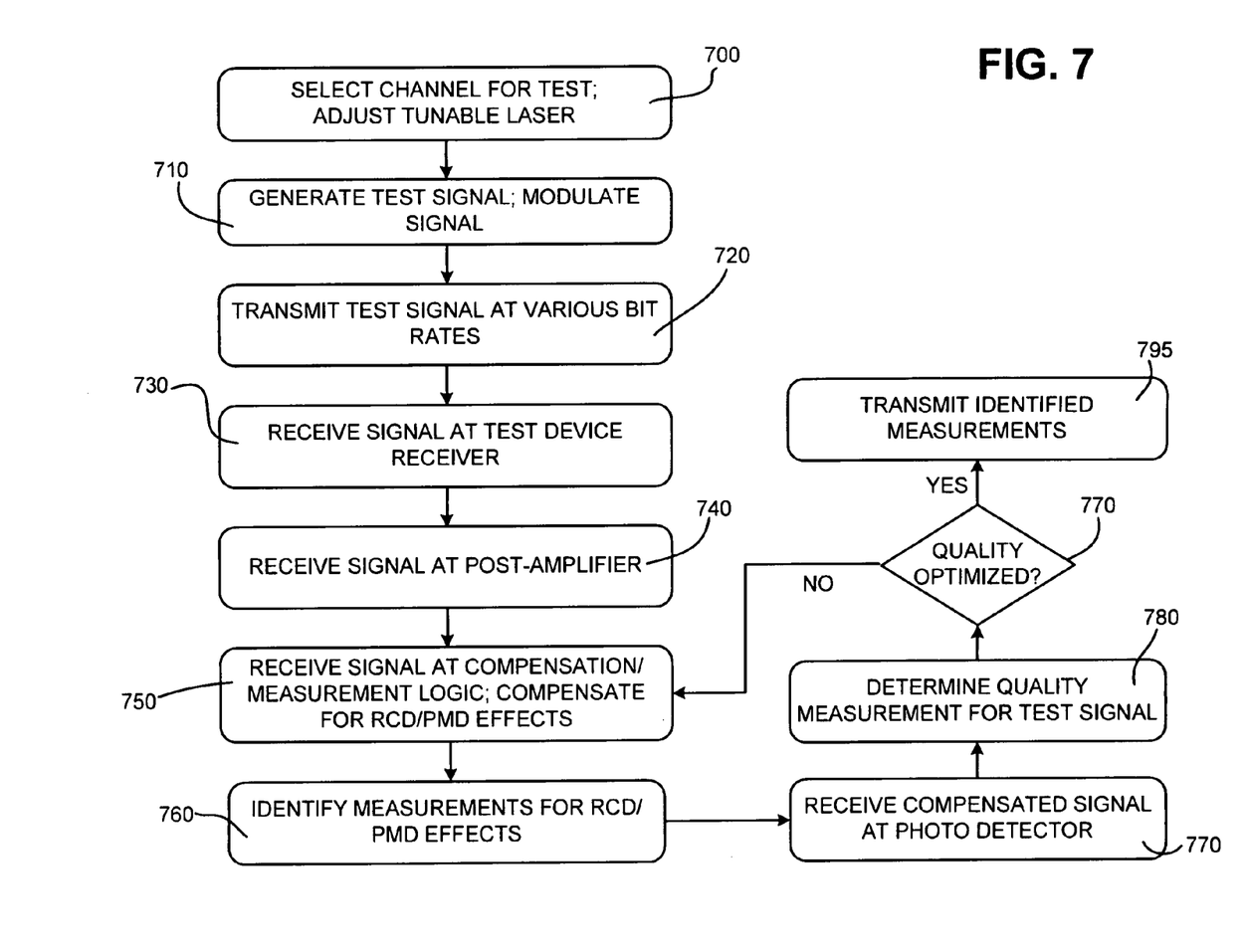
FIG. 7 is a flow diagram illustrating exemplary processing associated with testing the portion of the network shown in FIG. 3.

FIG. 7 is a flow diagram illustrating exemplary processing associated with testing an optical path and determining PMD effects associated with the path. Processing may begin by a network engineer or another party associated with monitoring network 100 identifying an available channel/path to test. For example, assume that a network engineer would like to test path 1 illustrated in FIGS. 2 and 3, which traverses nodes 110-1, 110-2, 110-9, 110-11 and terminates at node 110-6. As discussed above, traditional PMD testing of path 1 would require that the entire optical path be taken down (i.e., out of service). A PMD measurement would then be made for each span in the path (e.g., each fiber between neighboring nodes) using, e.g., a wavelength scanning technique across all channels in the span. A PMD for a particular path would then be estimated based on an aggregation of the span-based PMD measurements/estimations. As described above, these techniques are both unworkable (i.e., they require that the path be out of service) and less accurate (i.e., based on aggregated span-based PMD estimations). Further, traditional techniques fail to provide for more accurate PMD measurements in amplified systems (e.g., Raman, EDFA, or hybrid type amplifiers). In an exemplary implementation described below, in-service path PMD measurements may be made with respect to path 1 without requiring per span aggregation techniques.

To accomplish in-service path PMD measurement testing, the network engineer may identify a channel associated with path 1 upon which the test will be run (block 700). For example, the network engineer may identify a channel associated with path 1 which is idle or otherwise unused through ROADMs 110 illustrated in FIG. 3. In one implementation, a large number of channels may exist on each fiber in network 100 (e.g., 80 or more) and one or more channels may be idle throughout the selected path. For example, a C-band/L-band laser may emit optical signals divided into 80 channels ranging from 1525 nm to 1625 nm with a 50 GHz spacing between channels.

As described above, in some implementations, one or more optical switches may be used to transition a path from a first channel to a second channel, with the wavelength remaining consistent across the switch. In this implementation, additional testing devices may be required proximate to the optical switch(es). For the purposes of this example, assume that the network engineer identifies a single available or "dark" channel in the path 1 (block 700). Test device 300 may then be coupled to node 110-1, as illustrated in FIG. 3, and test device 310 may be coupled to node 110-6. Coupling test devices 300 and 310 to the appropriate nodes 110 may be accomplished by one or more network engineers or technicians. Alternatively, testing devices 300 and 310 may be integrated within nodes 110-1 and 110-6, respectively.

The network engineer may then adjust tunable laser 410 to the International Telecommunications Union (ITU) grid of the selected channel (block 700). For example, the selected channel may have a particular associated frequency and tunable laser 410 may be adjusted to that frequency.

Tunable laser 410 may generate a test signal (block 710). For example, as discussed above, tunable laser 410 may include an erbium doped fiber light source to inject test signals to the designated channel on path 1. In this implementation, the network engineer may turn on tunable laser 410 to transmit test signals to the appropriate channel at node 110-1.

In one implementation, the test signals may be modulated as a sine wave at a number of different bit rates.

As described above, in order to determine PMD and residual CD effects corresponding to a path, test device 300 may inject test signals into the path at varying bit rates, from 10 Gbps to 100 Gbps or higher, depending on the capacity of the network path. As discussed above, tunable laser 410 may remain on during the testing to ensure that power remains on the channel so that the channel under test is not turned off by one or more of ROADMs 110 or that signals on the optical path are not significantly attenuated once power is no longer detected on the channel.

Assume that test device 300 is configured as illustrated in FIG. 4. In this implementation, modulator 430 may receive the output of tunable filter 420 and modulate the test signal (block 710). For example, in one exemplary implementation, modulator 430 may modulate the test signal/data in a sinusoidal pattern at a selected bit rate (e.g., 10 Gbps, 40 Gbps, 100 Gbps, etc.). In addition, in some implementations, power controller 440 may be used to ensure that the power associated with the test signal is adequate with respect to the transmitting the test signal along the desired path (i.e., path 1 in this example). As discussed above, the power requirements may be based on the particular type of ROADMs associated with path 1. In other implementations, the power level may be pre-set in test device 300 for any number of different ROADMs being tested and the network engineer may simply input, via a user interface on test device 300, the type of devices/ROADMs being tested. In either case, the modulated test signal may be transmitted through path 1 illustrated in FIG. 3 at various bit rates (block 720). As discussed above, signal source 410 may maintain a constant power to eliminate or minimize gain adjustment during the testing of optical path 1.

Test device 310 coupled to the last or terminating node 110 of path 1 will receive at least a portion of the test signal after the signal has passed through nodes 110-1, 110-2, 110-9, 110-11 and 110-6 (block 730). That is, test device 310 may include a receiver coupled to an optical fiber associated with path 1 that will receive a portion of the originally transmitted test signal that was not clipped or shifted by components in path 1, such as filters or other devices. As discussed above, a number of amplifiers may be located along path 1 to amplify the optical signals transmitted in network 100.

Power conditioning logic 510 may receive the optical test signals received by the terminating node (i.e., node 110-6 in this example) (block 740). Power conditioning logic 510 may adjust the optical power of the received signal to a level consistent with or required by compensation/measurement logic 520. For example, as discussed above, in one implementation, power conditioning logic 510 may include an amplifier and/or attenuator.

Compensator/measurement logic 520 may receive the test signal and may compensate the signal for both residual chromatic dispersion effects and PMD effects (block 750). Compensator/measurement logic 520 may identify, for each of the tested bit rates, measurements for path PMD and CD based on the compensation (block 760). For example, compensator/measurement logic 520 may include tunable dispersion compensation logic 610 and PMD compensation logic 620 configured to dynamically compensate for RCD and PMD effects in the test signal.

Photo detector 540 may receive an optical output from compensator/measurement logic 520 and convert the received optical data from the optical domain into the electrical domain (block 770). For example, photo detector 540 may convert the received optical waveform into corresponding electrical signals that represent the optical waveform output by node 110-6. Photo detector 540 may analyze the electrical signals for elements such as data loss or other network metrics and determine a quality measurement of the test signal (block 780). For example, as described above, photo detector 540 may determine a BER or optical SNR associated with the test signal. Photo detector 540 may determine whether the quality value has been optimized (block 790).

If the quality value has not been optimized (e.g., that the current signal quality is better than the prior signal quality), the quality measurement may be transmitted to compensator/measurement logic 520 (block 790-NO) for use in optimizing the signal quality. If the quality value has been optimized (block 790-YES), communication logic 530 may display or transmit information relating to the identified PMD and CD measurements (e.g., to other devices associated with network 100) (block 795). For example, communication logic 530 may transmit PMD and CD measurement information to communication logic 450 in test device 300, e.g., via an out-of-band (i.e., non-optical) signal.

In the manner described above, PMD and/or RCD measurements associated with a selected channel in an optical network may be accurately determined. In addition, in one embodiment, the measurements may be performed without taking any active channels out of service. The PMD and/or RCD measurements may then be used to estimate the performance of the selected path through network 100 and also for troubleshooting one or more channels/paths.

Implementations described herein provide for determining polarization mode dispersion and/or chromatic dispersion of an optical path. The testing may be performed without taking any active channels out of service, thereby simplifying planning associated with network testing and also allowing network testing to be performed more frequently and dynamically as nodes are added/removed from the network or network topology otherwise changes. This may allow network planners to identify problems in a network before outages occur.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, implementations have been described above with respect to using network engineers or technicians to connect various test devices to nodes 110 in network 100. In other implementations, all or some portion of network testing may be initiated and/or analyzed remotely. For example, in an exemplary implementation, test data (e.g., modulated test data) may be injected or transmitted on a particular path remotely from a control center or operations center associated with monitoring network 100. Similarly, test data received at a termination node of an optical path may be forwarded to the control center/operations center for analysis. In such instances, network engineers or technicians may not have to physically go to various nodes to initiate the test or analyze test results. Further, while embodiments may allow for in-service testing/measuring and compensating, methods and systems described herein may be used in out-of-service network environments. Additionally, while the signal that test device 300 is described as a "test signal" and the process of FIG. 7 is described as a "test," in one embodiment the test signal generated by device 300 may include non-test data being sent from one node to another, such as from node 110-1 to node 110-6. The PMD testing/measurement system described above may be used in a variety of optical network architectures, including optical control plane and generalized multiprotocol label switching (GMPLS) systems.

In addition, in some implementations, various ROADMs that represent initiating and terminating nodes in an optical path may include the test circuitry described above as being included in test device 300 and test device 310, respectively. In such instances, no separate test devices may be needed to perform end-to-end optical path testing.

Further, features have been described above as testing an optical path with a relatively small number of nodes/ROADMs. In other implementations, optical paths with more or less nodes/ROADMs and/or other devices may be analyzed.

In addition, while series of acts have been described with respect to FIG. 7, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A method, comprising:
   generating a signal at a test initiating device;
   identifying, by the test initiating device, an unused channel in an in-service optical path, wherein the optical path includes at least two spans;
   receiving, by the test initiating device, a user selection of a first bit rate from among a plurality of available bit rates;
   modulating, by the test initiating device, the signal at the first bit rate to generate a first test signal;
   transmitting, by the test initiating device, the first test signal on the unused channel;
   receiving the first test signal at a test destination device;
   compensating, by the test destination device, the first test signal for polarization mode dispersion (PMD) effects;
   determining, by the test destination device, a PMD measurement for the first test signal based on the compensation;

transmitting, by the test destination device, the PMD measurement for the first test signal to the test initiating device;
receiving, by the test initiating device, a user selection of a second bit rate from among the plurality of bit rates;
modulating, by the test initiating device, the signal at the second bit rate to generate a second test signal;
transmitting, by the test initiating device, the second test signal on the unused channel;
receiving the second test signal at the test destination device;
compensating, by the test destination device, the second test signal for PMD effects;
determining, by the test destination device, a PMD measurement for the second test signal based on the compensation; and
transmitting, by the test destination device, the PMD measurement for the second test final to the initiating device.

2. The method of claim 1, further comprising:
transmitting the PMD measurements for the first and second test signals to a network device remote from the test destination device.

3. The method of claim 2, wherein the network device comprises the test initiating device.

4. The method of claim 1, wherein the plurality of available bit rates comprise a 10 gigabits per second (Gbps) bit rate, 40 Gbps bit rate, and a 100 Gbps bit rate.

5. The method of claim 1, wherein compensating the signal for PMD effects further comprises:
compensating for chromatic dispersion effects to generate a first compensated signal; and
compensating the first compensated signal for PMD effects.

6. The method of claim 1, wherein generating the signal further comprises:
adjusting a tunable laser at the test initiating device based on a wavelength of the identified unused channel upon which the signal is to be transmitted; and
activating the tunable laser at the test initiating device to generate the signal.

7. The method of claim 1, wherein the path includes one or more reconfigurable optical add-drop multiplexers, optical amplifiers, or optical switches.

8. The method of claim 1, wherein the test initiating device identifies the unused channel from a number of channels that also includes in-service channels.

9. The method of claim 1, further comprising:
receiving, at the test initiating device, a request to initiate signal generation from a remote network device.

10. The method of claim 1, wherein at least one of the generating, identifying, modulating, transmitting, receiving, compensating, or determining is done remotely with respect to the optical path.

11. A device, comprising:
interface logic for receiving a user selection of an unused channel in an in-service optical fiber,
wherein the interface logic is further configured to receive a first selected bit rate from a number of available bit rates;
a tunable signal source configured to emit a test signal on the optical fiber at a wavelength associated with the selected unused channel; and
a bit rate modulator configured to modulate the test signal at the first selected bit rate and forward the modulated test signal onto the optical fiber; and
communication logic to receive first polarization mode dispersion (PMD) measurement information associated with the unused channel in the optical fiber being tested at the first selected bit rate,
wherein the interface logic is further configured to receive a second selected bit rate from the number of available bit rates,
wherein the bit rate modulator is configured to modulate the test signal at the second selected bit rate and forward the modulated test signal onto the optical fiber, and
wherein the communication logic is configured to receive second PMD measurement information associated with the unused channel in the optical fiber being tested at the second selected bit rate.

12. The device of claim 11, further comprising:
a power controller to match a launch power of the test signal to a dense wave division multiplexing (DWDM) individual channel power.

13. The device of claim 12, wherein the power controller comprises a pre-amplifier.

14. The device of claim 11, further comprising:
display logic to display the first PMD measurement information and the second PMD measurement information to a user.

15. A system, comprising:
a first measurement device configured to be coupled to a first node in an in-service optical path being measured, the first measurement device configured to:
generate a signal at an initiating device;
identify an unused channel in the in-service optical path, wherein the optical path includes at least two spans;
receive a user selection of a first bit rate receiving from among a plurality of available bit rates;
modulate the signal at the first bit rate to generate a first test signal; and
transmit the first test signal on the unused channel;
receive a user selection of a second bit rate receiving from among the plurality of available bit rates;
modulate the signal at second first bit rate to generate a second test signal and
transmit the second test signal on the unused channel; and
a second measurement device configured to be coupled to a last node in the optical path being measured, the second measurement device configured to:
receive the first test signal;
compensate the first test signal for polarization mode dispersion (PMD) effects;
determine a first PMD measurement associated with the optical path being measured and the first bit rate based on the compensation;
transmit the first PMD measurement to the first measurement device;
receive the second test signal;
compensate the second test signal for PMD effects;
determine a second PMD measurement associated with the optical path being measured and the second bit rate based on the compensation: and
transmit the second PMD measurement to the first measurement device.

16. The system of claim 15, wherein the second measurement device is further configured to:
compensate for chromatic dispersion effects prior to compensating for the PMD effects.

* * * * *